(12) United States Patent
Zickar et al.

(10) Patent No.: US 12,687,243 B2
(45) Date of Patent: Jul. 21, 2026

(54) VACUUM ANGLE VALVE COMPRISING A PRESSURE SENSOR

(71) Applicant: VAT HOLDING AG, Haag (CH)

(72) Inventors: Michael Zickar, Goldach (CH); Andreas Wechsel, Sevelen (CH); Martin Netzer, Bludenz (AT)

(73) Assignee: VAT HOLDING AG (CH)

( * ) Notice: Subject to any disclaimer, the term of this patent is extended or adjusted under 35 U.S.C. 154(b) by 0 days.

(21) Appl. No.: 18/839,234

(22) PCT Filed: Feb. 14, 2023

(86) PCT No.: PCT/EP2023/053563
§ 371 (c)(1),
(2) Date: Aug. 16, 2024

(87) PCT Pub. No.: WO2023/156359
PCT Pub. Date: Aug. 24, 2023

(65) Prior Publication Data
US 2025/0155030 A1 May 15, 2025

(30) Foreign Application Priority Data

Feb. 17, 2022 (DE) ..................... 10 2022 000 602.2

(51) Int. Cl.
*F16K 51/02* (2006.01)
*F16K 31/04* (2006.01)
(Continued)

(52) U.S. Cl.
CPC ............ *F16K 51/02* (2013.01); *F16K 37/005* (2013.01); *F16K 31/04* (2013.01); *F16K 41/10* (2013.01)

(58) Field of Classification Search
CPC . F16K 51/02; F16K 1/02; F16K 31/04; F16K 41/10; F16K 41/103; F16K 37/005; F16K 27/0272; F16K 27/02
See application file for complete search history.

(56) References Cited

U.S. PATENT DOCUMENTS 4,099,704 A * 7/1978 Okumura ................ F16K 37/00
                                                        318/474
5,318,272 A * 6/1994 Smith ..................... F16K 31/04
                                                        251/129.11
(Continued)

FOREIGN PATENT DOCUMENTS

CN        106594385 A  *  4/2017  ......... F16K 31/0655
CN        207975304 U  *  10/2018
(Continued)

OTHER PUBLICATIONS

International Search Report and Written Opinion—PCT/EP2023/053563—May 23, 2023.
(Continued)

*Primary Examiner* — David Colon-Morales
(74) *Attorney, Agent, or Firm* — Muncy, Geissler, Olds & Lowe, P.C.

(57) ABSTRACT

A vacuum valve includes a valve housing having a first port in the direction of a first axis, a second port in the direction of a second axis and a valve seat. The vacuum valve further includes: a valve disk, a drive unit, wherein a controlled displacement of the valve disk along or orthogonally to the first axis is provided by means of the drive unit, and a control unit for controlling the displacement of the valve disk. The vacuum valve has a pressure sensor to measure a process pressure present in the flow chamber can be measured. The control unit is configured to provide process information, the process pressure present in the flow chamber is measured by the pressure sensor, and the displacement of the valve disk (Continued)

is controlled as a function of the processed process information and the process pressure.

16 Claims, 4 Drawing Sheets

(51) Int. Cl.
*F16K 37/00* (2006.01)
*F16K 41/10* (2006.01)

(56) References Cited

U.S. PATENT DOCUMENTS

| | | | | |
|---|---|---|---|---|
| 5,848,608 A * | 12/1998 | Ishigaki | | F16K 41/10 |
| | | | | 251/60 |
| 6,321,780 B1 * | 11/2001 | Iwabuchi | | F16K 49/002 |
| | | | | 137/341 |
| 6,491,059 B2 * | 12/2002 | Kajitani | | F16K 51/02 |
| | | | | 137/530 |
| 6,508,268 B1 * | 1/2003 | Kouketsu | | F16K 51/02 |
| | | | | 137/488 |
| 6,581,635 B2 * | 6/2003 | Furutate | | F16K 39/024 |
| | | | | 137/556 |
| 6,772,989 B2 * | 8/2004 | Enzaki | | F16K 31/1221 |
| | | | | 251/63.5 |
| 6,877,715 B2 * | 4/2005 | Kajitani | | F16K 41/10 |
| | | | | 251/63.5 |
| 7,036,790 B2 * | 5/2006 | Kajitani | | F16K 41/10 |
| | | | | 251/122 |
| 7,036,794 B2 * | 5/2006 | Duelli | | F16K 31/12 |
| | | | | 137/488 |
| 7,070,159 B2 * | 7/2006 | Kajitani | | F16K 31/047 |
| | | | | 251/285 |
| 7,163,025 B2 * | 1/2007 | Kajitani | | F16K 51/02 |
| | | | | 251/285 |
| 7,841,578 B2 * | 11/2010 | Ishigaki | | F16K 51/02 |
| | | | | 251/366 |
| 7,862,002 B2 * | 1/2011 | Naitoh | | F16K 31/1221 |
| | | | | 251/63.5 |
| 8,132,782 B2 * | 3/2012 | Duelli | | F16K 51/02 |
| | | | | 251/193 |
| 8,141,847 B2 * | 3/2012 | Fischer | | F16K 3/18 |
| | | | | 251/193 |
| 8,714,523 B2 * | 5/2014 | Lee | | F16K 41/10 |
| | | | | 251/63.6 |

| | | | | |
|---|---|---|---|---|
| 9,206,919 B2 * | 12/2015 | Neumeister | | F16K 27/02 |
| 9,267,614 B2 * | 2/2016 | Yamada | | F16K 27/02 |
| 9,695,948 B2 * | 7/2017 | Kienreich | | F16K 1/02 |
| 9,851,012 B2 * | 12/2017 | Kienreich | | F16K 27/02 |
| 10,260,655 B2 * | 4/2019 | Kim | | F16K 1/48 |
| 10,509,423 B2 * | 12/2019 | Madlener | | G05D 16/024 |
| 10,738,910 B2 * | 8/2020 | Steffen | | F16K 31/52408 |
| 11,098,823 B2 * | 8/2021 | Iijima | | F16K 49/002 |
| 11,104,997 B2 * | 8/2021 | Miyashita | | H01L 21/02211 |
| 11,668,409 B2 * | 6/2023 | Gentile | | F16K 31/508 |
| | | | | 251/46 |
| 2002/0134441 A1 * | 9/2002 | Kusumoto | | F16K 51/02 |
| | | | | 137/625.3 |
| 2003/0011136 A1 * | 1/2003 | Ramirez | | F16K 37/0091 |
| | | | | 277/500 |
| 2009/0057600 A1 * | 3/2009 | Watanabe | | F16K 31/1262 |
| | | | | 251/335.2 |
| 2012/0160344 A1 * | 6/2012 | Itafuji | | H01L 21/6719 |
| | | | | 251/324 |
| 2014/0130907 A1 * | 5/2014 | Watanabe | | G05D 16/024 |
| | | | | 137/487.5 |
| 2014/0374637 A1 * | 12/2014 | Nakamura | | F02M 26/54 |
| | | | | 251/248 |
| 2019/0316703 A1 * | 10/2019 | Dohi | | F16K 7/16 |
| 2021/0180599 A1 * | 6/2021 | Hayase | | F04C 28/24 |

FOREIGN PATENT DOCUMENTS

| | | | | | |
|---|---|---|---|---|---|
| CN | 211501659 U | * | 9/2020 | | |
| DE | 102007034926 A1 | | 7/2007 | | |
| DE | 202008005238 U1 | * | 7/2008 | | F16K 31/0655 |
| EP | 0264466 A1 | * | 4/1988 | | F16K 41/10 |
| JP | 2007146908 A | | 6/2007 | | |
| JP | 2008069787 A | | 3/2008 | | |
| JP | 2011134183 A | * | 7/2011 | | |
| KR | 20110074688 A | * | 7/2011 | | H01L 21/02 |
| KR | 20150100519 A | * | 9/2015 | | F16K 27/02 |
| WO | 2006045317 A1 | | 5/2006 | | |

OTHER PUBLICATIONS

International Preliminary Report on Patentability—PCT/EP2023/053563—Aug. 20, 2024.
German Office Action—Application No. 10 2022 000 602.2—Dec. 12, 2022.

* cited by examiner

VACUUM ANGLE VALVE COMPRISING A PRESSURE SENSOR

CROSS-REFERENCE TO RELATED APPLICATIONS

The present application is a national stage application, filed under 35 U.S.C. § 371, of International Patent No. PCT/EP2023/053563, filed Feb. 14, 2023, which claims priority to German Patent Application No. 10 2022 000 602.2, filed Feb. 17, 2022, each of which are herein incorporated by reference in their entirety.

BACKGROUND OF THE INVENTION

The present invention relates to a vacuum angle valve having a pressure sensor for substantially gas-tight interruption of a flow path between two angularly arranged ports.

Valves of the type mentioned above are known from the prior art in various embodiments. Vacuum valves are used in particular in the field of IC and semiconductor production, which has to take place in a protected atmosphere as far as possible without the presence of contaminating particles.

A valve known in the prior art and described, for example, in U.S. Pat. No. 6,772,989 has a valve body with two ports arranged perpendicular to each other in one direction, a valve seat arranged in a flow path connecting the two ports in the flow chamber, and an opening opposite the valve seat. A piston of a pneumatic cylinder system is arranged in a valve cover that closes the opening and drives a valve disk that opens and closes the valve seat via a valve rod. The valve cover is attached to the opening in a gas-tight manner by a bellows plate. A return spring between the valve disk and the valve cover is compressed when the valve seat opens, so that the valve closes by spring force.

The valve cover has a connection which supplies and discharges compressed air into a pressure chamber located on the bellows plate side and delimited by the piston. The two ends of a bellows surrounding the valve stem are attached in a gas-tight manner to the inner edge surface of the bellows plate and to the valve disk. On the surface facing the valve seat, the valve disk has an annular retaining groove in which a sealing ring is arranged.

The valve body is usually made of aluminum or stainless steel, or internally coated with aluminum or other suitable material, while the valve disk and bellows are usually made of steel. The bellows, which can be expanded and compressed along its longitudinal axis within the range of the travel of the disk, seals the flow chamber in an airtight manner from the return spring, the valve stein and the pressure chamber. Two main types of bellows are used. On the one hand, the diaphragm bellows, and on the other, the corrugated bellows, the latter being distinguished from the diaphragm bellows by the fact that it has no welded seams and is easier to clean, but has a smaller maximum stroke.

Another angle valve is known from WO 2006/045317 A1, which has a manually operable mechanism for opening and closing the valve. A lever, which is rotatable by, for example, 180°, protrudes from the interior of the mechanism and is connected to an inner gate which is likewise rotatable, By moving the lever and an interaction of the gate with an element following this gate, the opening and closing of the valve can be implemented. Due to its specific construction, the system has a comparatively large area that represents a connection of the inner mechanics with the environment (slot in the housing for the movement of the lever).

Furthermore, angle valves of the same type are known which have a motor for moving the valve disk. Various mechanisms and gears are known for converting the rotary motor movement into a linear movement for opening and closing the valve disk.

A common disadvantage of the above-mentioned vacuum angle valves when used in vacuum technology is the comparatively coarse controllability of certain valve opening states. This can result, for example, in comparatively fast valve opening. This comparatively coarse controllability also becomes relevant when the valve is used to control different process steps with, for example, different process gases and pressures.

Opening or closing the valve too quickly can result in fluid flows into and out of the process chamber that do not exhibit predominant laminarity or homogeneous flow behavior, but can cause turbulence in the process volume. However, turbulence must be avoided, especially in vacuum applications, as this can cause particles to be loosened and distributed in the process volume and consequently lead to unwanted contamination of a substrate.

In order to enable both a fast flooding of a process chamber and a slow opening or closing movement with small opening cross-sections, solutions are known in the prior art, wherein two separate angle valves are provided for the respective control section.

SUMMARY OF THE INVENTION

It is therefore the object of the invention to provide an improved angle valve for use in the vacuum range which overcomes the above-mentioned disadvantages.

More specifically, it is an object of the invention to provide such a vacuum angle valve which has improved precision and reliability for controlling various processes or process steps.

Another object is to provide a vacuum valve with which different process steps can be controlled precisely and reliably as a whole.

These objects are solved by the realization of the characterizing features of the independent claim. Features which further from the invention in an alternative or advantageous manner are to be taken from the dependent claims.

The idea of the present invention is based on the integration of a pressure sensor in a vacuum valve and the control or regulation of the valve based on pressure information from the flow path that can be obstructed by the valve.

The integrated combination of the pressure sensor in the vacuum valve allows direct and process-dependent valve control to be implemented. No further control or measurement components are required for this. The control of the vacuum valve can be individually adapted to a process and its parameters (e.g. desired pressure profile, type of process gas used, mass inflow rate for a process gas, etc.). The valve according to the invention can then be provided with a corresponding process specification alone, for example, and the valve provides a desired pressure profile on this basis.

Accordingly, the invention relates to a vacuum valve for gas-tight interruption of a flow path, comprising a valve housing. The valve housing has a first port in the direction of a first axis, a second port in the direction of a second axis, and a valve seat, wherein the valve seat is arranged in the flow path of a flow chamber and the flow chamber interconnects the first port and the second port. In particular, the second axis may extend in parallel or substantially orthogonally (especially when formed as an angle valve) to the first axis.

The ports have, for example, a circular cross-section. In particular, the flow chamber is that section of the valve which can be flooded with a flid when the valve is closed or open, at least from one of the two ports.

The valve also has a valve disk, e.g. a cylindrical piston, which can be axially guided at least partially within the flow chamber along or orthogonally to the first axis (axis of movement) perpendicular to a surface of the valve seat by an adjustment path.

By moving the valve disk, a closure surface of the valve disk facing the valve seat and having in particular a sealing material or a sealing body—for example in the form of an O-ring located in a fastening groove—can be brought into contact (closed position, interrupting the flow path) or out of contact (open position, releasing the flow path) with the valve seat. This either interrupts the flow path in a substantially gas-tight manner or releases it.

The closure surface can be formed by the end face of the valve disk. In particular, the closure surface and the surface of the valve seat are designed in such a way that they can come to rest on each other. Preferably, the axis of movement of the valve disk extends perpendicularly to both surfaces. However, it is alternatively possible for the two surfaces to be inclined or uneven. In this case, the closure surface and the surface of the valve seat are virtual, averaged surfaces to which the axis is perpendicular.

One advantage of the valve according to the invention is that essentially only the valve housing and the valve disk are directly adjacent to the flow chamber of the valve. Since the medium flowing through the valve, such as process gas, is thus exposed only to the smoothly formable closure surface, the smoothly formable outer surface of the valve part and the inner surface of the valve housing, the valve has little tendency to become contaminated and a possible reaction surface for the gas is small. The valve part can be manufactured in particular from aluminum or stainless steel or another suitable material, so that it is possible to use only one material in the flow chamber. This reduces the risk of unwanted reactions between a valve component and the process gas. Furthermore, the proportion of the flow chamber volume directly involved in the flow is relatively large, so that flow losses are low.

The valve also has a drive unit that is coupled to the valve disk in such a way that a controlled displacement of the valve disk along or orthogonal to the first axis can be provided by means of the drive unit. In this way, opening and closing of the valve can be controlled by means of a defined activation of the drive unit and thus executed precisely.

The drive unit can, for example, have an electric motor or a servo-pneumatic drive. The electric motor or the servo-pneumatic drive can be coupled to the valve disk in such a way that a controlled displacement of the valve disk along the first axis can be provided by means of the electric motor or the servo-pneumatic drive.

The vacuum valve also has a control unit for controlling the displacement of the valve disk.

The vacuum valve also has a pressure sensor arranged in such a way that a process pressure present in the flow chamber can be measured by means of the pressure sensor. The pressure sensor can thus be used to provide information about the pressure of a fluid in the flow chamber.

The control unit has a process control functionality for controlling a process step. The process control functionality is set up in such a way that, during its execution, process information provided is processed, the process pressure present in the flow chamber is measured by the pressure sensor, and the displacement of the valve disk is controlled as a function of the processed process information and the process pressure.

For this purpose, the pressure sensor is connected in particular to the control unit for transmitting pressure signals, pressure values or a pressure information.

The vacuum valve thus enables measurement of the pressure of the fluid (e.g. process gas) in the flow chamber and control of the opening or closing state of the valve based on the measured pressure. As a result of an integrated design of the valve, i.e. the arrangement of the pressure sensor directly at or in the valve, a compact valve solution is provided, which allows a regulation-based pressure adjustment and control in a process chamber connected to the flow chamber (e.g. by means of the first port).

In one embodiment, the process control functionality may be configured such that the displacement of the valve disk is continuous and/or dependent on a time variable. The time variable can, for example, be a time marker in a process step that is linked to a specific process pressure.

Alternatively or additionally, the process information can have a nominal regulation profile. The nominal regulation profile can define a nominal pressure for the process step as a function of a process time. In particular, the nominal regulation profile thus provides the desired profile of a pressure change for a process step or the process information defines a nominal pressure profile for at least part of the process step.

In one embodiment, the process information may comprise information about a process gas provided in the flow chamber. In particular, a type of gas or an inflow rate for the process gas may be provided.

According to one embodiment, the process control functionality can be designed such that a displacement speed for the displacement of the valve disk (along or orthogonal to the first axis) can be set or is set depending on the process information.

In particular, the process control functionality can be set up in such a way that the valve disk is moved or can be moved at different speeds during the process step.

Based on the above information, a pressure change, even a multiple pressure change, can be controlled and/or regulated during the execution of a process step. Accordingly, the vacuum valve can also provide different rates of pressure change for a process step.

In one embodiment, the process step may include, for example, a venting process for a process chamber connected to the vacuum valve. The process information may then provide a venting pressure profile for the venting process. The drive unit can be controlled by the process control functionality in such a way that, in a first venting section, the valve disk is displaced from the closed position to a first open position at a first displacement speed and, in a second venting section, the valve disk is displaced from the first open position to a second open position at a second displacement speed. The first displacement speed is smaller than the second displacement speed and the first open position provides an opening cross-section that is smaller than an opening cross-section of the second open position.

In this way, the valve can be opened in stages, with the different opening speeds enabling the process chamber to be ventilated evenly and as uniformly as possible. In particular, this can prevent fluid turbulence and thus particle transport in the process volume.

It is understood that venting can take place in more than two venting sections with further different displacement speeds.

Alternatively, an evacuation of the process chamber can be implemented accordingly. The process step can then comprise an evacuation process for a process chamber connected to the vacuum valve. The process information provides an evacuation pressure profile for the evacuation process. The drive unit can be controlled by the process control functionality in such a way that, in a first evacuation section, the valve disk is displaced from a third open position to a fourth open position at a third displacement speed, and, in a second evacuation section, the valve disk is displaced from the fourth open position to the closed position at a fourh displacement speed, with the fourth displacement speed being smaller than the third displacement speed and the fourth open position providing an opening cross-section that is smaller than an opening cross-section of the third open position.

Again, it is understood that evacuation can take place in more than two evacuation sections with further different displacement speeds.

In one embodiment, the valve housing may have a recess, in particular a recess facing the flow, chamber. The pressure sensor can be arranged in the recess.

In particular, the recess may have a channel or bore provided therethrough.

In particular, the recess can connect the flow chamber and a valve outer side and the pressure sensor can be arranged at the valve outer side and connected to the recess.

Thus, the pressure sensor is able to provide a pressure measurement in the flow chamber, while the sensor itself is not provided in the flow chamber. Such an arrangement makes it possible to avoid undesirable interference points in the flow chamber, which can lead to flow turbulence when process gas flows around them, for example.

In one embodiment, the vacuum valve may comprise a sleeve, with the sleeve being shaped and arranged (within the valve housing) such that a intermediate space is formed between a sleeve outer wall (sleeve outer wall) of the sleeve and an inner wall of the valve housing, the sleeve wall having a sleeve recess, and the sleeve recess connecting the intermediate space and the flow chamber.

The sleeve recess thus provides an opening in the sleeve wall in particular and allows fluid to flow through the opening. The sleeve recess can, for example, be formed as a slot or hole in the sleeve wall.

In particular, the recess of the valve housing can be arranged and shaped in such a way that this recess connects the pressure sensor and the intermediate space formed by the sleeve.

In particular, the recess of the valve housing and the sleeve recess can be arranged and shaped in such a way that these recesses connect the pressure sensor and the flow chamber. For example, the sleeve recess can face the side of the valve housing that has the recess of the valve housing.

By arranging such an inner sleeve in the valve housing, e.g. on the side of the first port, a homogeneous fluid flow through the flow chamber can be achieved, while at the same time a pressure measurement can be carried out by means of the pressure sensor.

In particular, the sleeve can be inserted into the flow chamber through one of the ports. The sleeve can extend up to or close to the valve seat. Particularly when extending to the valve seat, the intermediate space in the closed position can be limited or closed off on one side by the valve disk.

In one embodiment, a length of a flow path in the intermediate space from the sleeve recess to the recess can be in a range of 20 times to 40 tires the width of the intermediate space. In particular, the width of the intermediate space corresponds to a distance from the inner wall of the valve housing to the sleeve or the opposite sleeve wall. In other words, the flow path is at least 20 times longer than the width of the intermediate space.

BRIEF DESCRIPTION OF THE DRAWINGS

The device according to the invention is described in more detail below by means of specific exemplary embodiments shown schematically in the drawings, purely by way of example, with further advantages of the invention also being discussed, with the figures showing in detail.

DETAILED DESCRIPTION OF THE INVENTION

Figure 1:
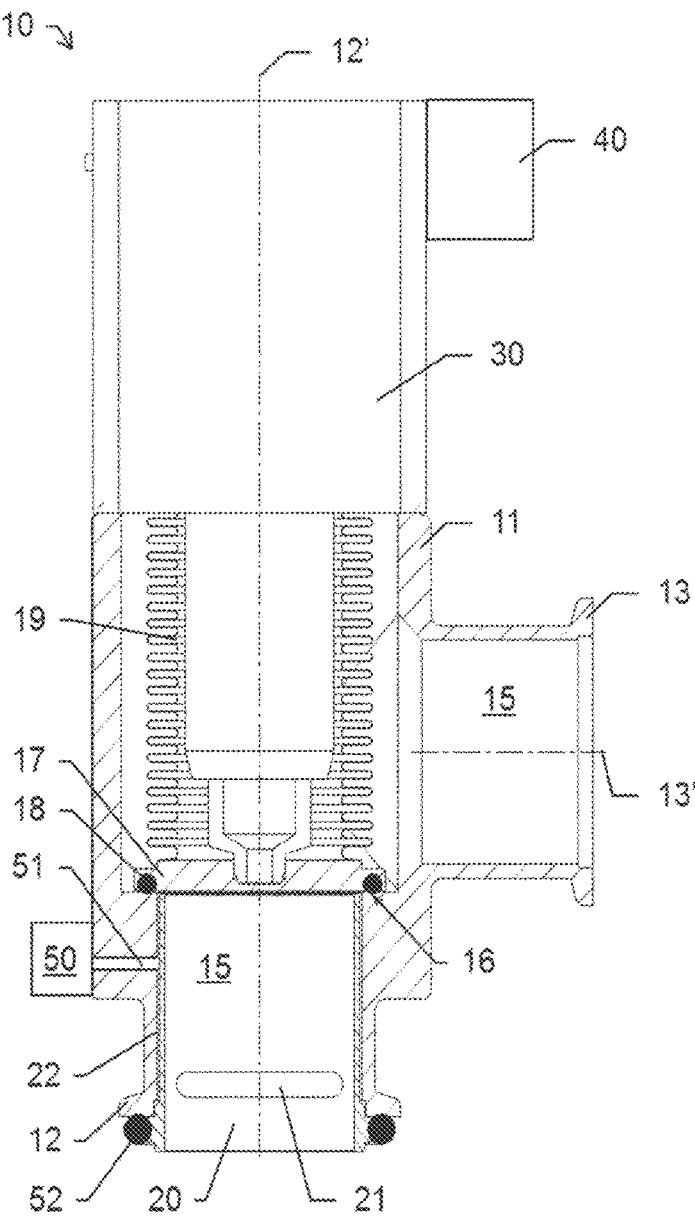
FIG. 1 shows a first embodiment for an angle valve according to the invention.

FIG. 1 shows a valve 10 designed as an angle valve according to the invention.

The angle valve 10 has a valve housing 11 with a first port 12 and a second port 13. The ports 12, 13 are oriented substantially orthogonally to each other. The first port 12 correspondingly defines a first axis 12' and the second port 13 defines a second axis 13', wherein these axes 12' 13' are also correspondingly orthogonal relative to each other. An axis intersection point is located inside the housing 11.

The two ports 12, 13 define a flow path for a medium or fluid (e.g. process gas). The flow path extends through a flow chamber 15, which connects the two ports 12, 13. The flow path can be interrupted or released by means of the valve 10.

The valve has a drive unit 30. In particular, the drive unit 30 has a controllable electric motor whose drive shaft is structurally connected to a valve closure 17 (valve disk) of the valve 10 by means of a drive mechanism (gear). The drive unit 30 in the embodiment shown has a spindle drive with a threaded rod and a guide element cooperating with the threaded rod and movable along the axis 12' by a rotation of the threaded rod. The guide element is coupled to the valve disk 17.

The movable valve disk 17 is arranged inside the valve housing 11. The valve disk 17 has a closure surface with a circumferentially arranged sealing material 18, by means of which a gas-tight interruption of the flow path can be provided when contact is made with a valve seat 16 on the housing side. The valve disk 17 can be of piston-shaped design, for example. The sealing material can, for example, comprise an O-ring made of fluoropolymer or a (cured-on) vulcanized seal.

The valve 10 also has a bellows 19. The bellows 19 is connected on the one hand to the valve disk 17 and on the other hand to an inner housing part of the valve 10. The bellows 19 can be designed as a metallic corrugated bellows or diaphragm bellows. The bellows 19 provides an atmospheric separation of at least parts of the drive unit (e.g. threaded rod) and the flow chamber 15. This can prevent particles generated on the drive side from entering the flow chamber 15.

The valve 10 also has a control unit 40 for controlling the displacement of the valve disk 17. The control unit 40 is connected to the electric motor for the control thereof.

Figure 2:
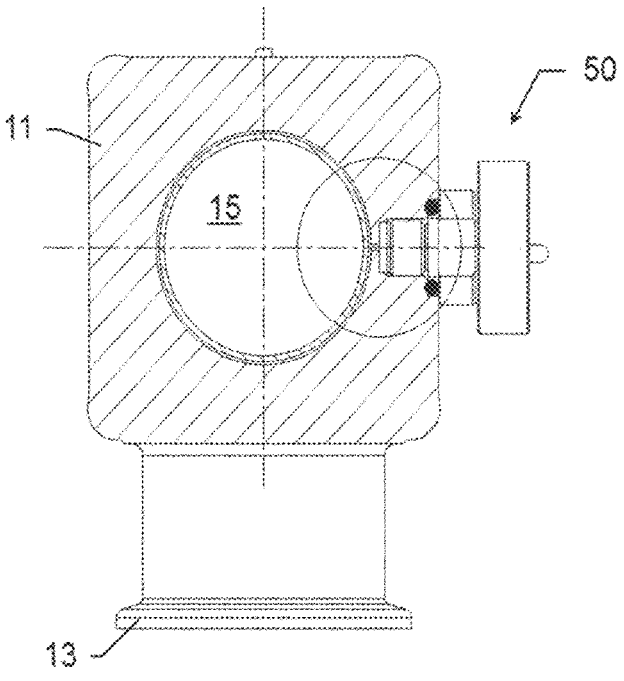
FIG. 2 shows a sectional view illustrating the angle valve and the pressure sensor according to the invention.

As also show in FIG. 2, the vacuum angle valve 10 further comprises a pressure sensor 50. The pressure sensor 50 is arranged in such a way that a pressure present in the flow chamber can be measured by means of the pressure sensor (50).

In one embodiment, the inner wall of the valve 10 can have a recess for this purpose, for example, in which the sensor can be arranged. The pressure sensor can be located inside the valve housing.

Figure 3:
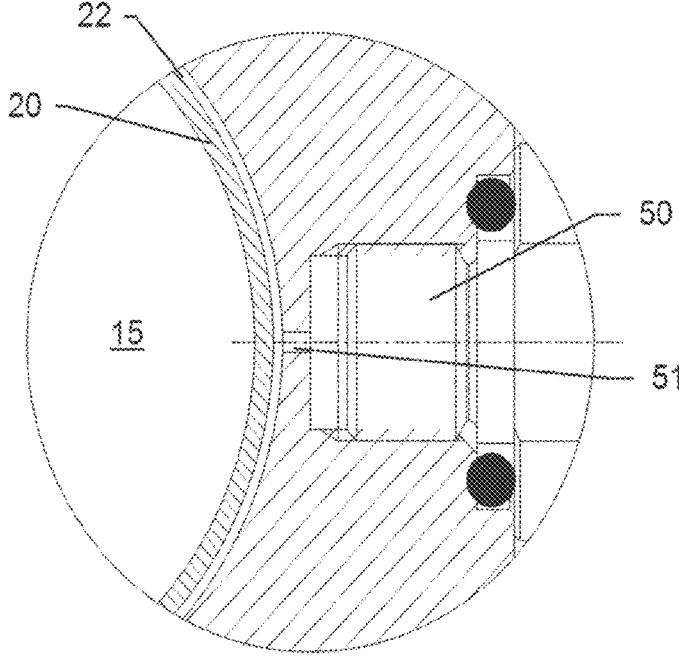
FIG. 3 shows an enlarged sectional view illustrating the angle valve and the pressure sensor according to the invention.

In the embodiment shown, the valve wall has a recess 51 in the area of the flow chamber 15 adjacent to the first port 12. This can also be seen in FIG. 3, which shows an enlarged section of FIG. 2. The recess 51 is designed as a channel-like wall passage and connects the pressure sensor 50 to the flow chamber 15. The pressure sensor 50 itself is arranged here in an outer area of the valve 10, i.e. not inside the valve housing 11. The recess 51 allows atmospheric exchange between the pressure sensor 50 and the flow chamber 15, int which a process gas can be applied.

One advantage of this arraignment is the simplified replaceability of the pressure sensor 50, for example in the event of regular maintenance or a defect in the sensor.

An auxiliary valve can also be arranged for this purpose (not shown). The auxiliary valve can be connected to the fluid-carrying recess 51 (e.g. at its end) or arranged in the course of this recess. This auxiliary valve can be used to interrupt a fluid flow through the recess 51 (channel). The recess 51 can thus be sealed (gas-tight).

The pressure sensor 50 is then replaced in particular by first closing the auxiliary valve so that the vacuum area (flow chamber 15) is separated from the outside area, then replacing the sensor and reopening the auxiliary valve so that the new sensor can again provide a pressure measurement with respect to the flow chamber.

The pressure sensor 50 can alternatively be arranged in the area of the second port 13 or in the area of the valve seat 16, optionally inside or outside the valve housing 11.

In the embodiment shown, the vacuum valve 10 further comprises a sleeve 20. However, the invention also relates to alternative embodiments without such a sleeve 20.

The connection of the pressure sensor 50 with the flow chamber 15 is provided in the shown embodiment by means of the sleeve 20. This inner sleeve 20 is shaped for this purpose and adapted to the valve housing 11 in terms of its spatial extension in such a way that an intermediate space 22 is formed between the inserted sleeve 20 and the inner wall of the valve housing 11. The pressure sensor 50 is in communication with the intermediate space 22 through the channel 51.

The sleeve 20 has a sleeve recess 21 in the sleeve wall. The sleeve recess 21 provides an opening between the flow chamber 15 and the intermediate space 22. The sleeve recess 21 thus provides an atmospheric communication link between the flow chamber 15 and the intermediate space 22. Thus, the pressure sensor 50 is connected to the flow chamber 15 and can provide a pressure measurement of the pressure prevailing in the flow chamber 15.

A seal 52 between the sleeve 20 and the port 12 of the valve 10 provides a gas-tight connection between the sleeve 20 and the valve 10. In the area of the port 12, the sleeve 20 is positively connected to the port 12 or fitted into the port 12. The intermediate space 22 is thus limited by this positive connection.

The inserted sleeve 20 provides an improved laminar flow of a fluid through the flow chamber 15. The arrangement of the sleeve recess 21 allows the fluid to be guided homogeneously through the flow chamber 15.

For this purpose, in particular a plurality of (at least two) sleeve recesses can be provided in the sleeve. For example, two opposite or several such sleeve recesses distributed over the sleeve circumference can lead to a uniform flow related to the cross-section of the flow chamber 15. In this way, any non-laminar flow effects can occur evenly distributed and thus still result overall in improved homogeneity of the flow.

In particular, the sleeve recess 21 can be shaped in such a way that no or negligible turbulence is generated due to an interaction between the sleeve recess 21 and the fluid flowing past.

The sleeve 20 thus prevents a single undesired interference point (transition between valve inner wall and recess 51) from being present inside the flow chamber 15, which directly carries a process fluid. Such a single point of interference could cause an asymmetrical, unwanted flow behavior of the fluid.

Figure 4A:
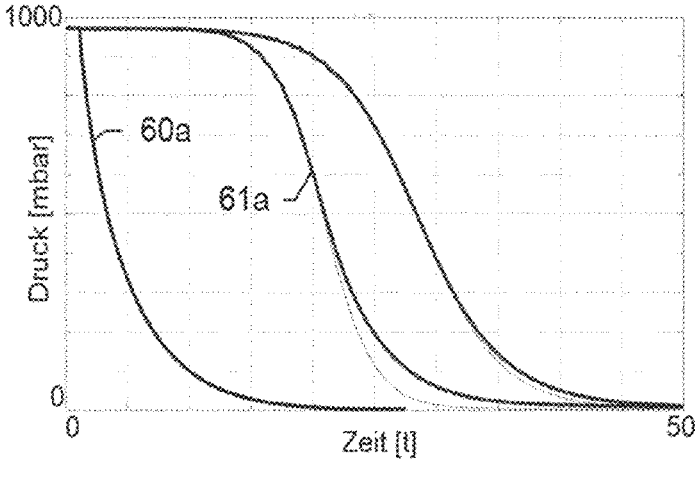
FIGS. 4a-b shows different pressure profiles for evacuation and venting of the process chamber.
Figure 4B:
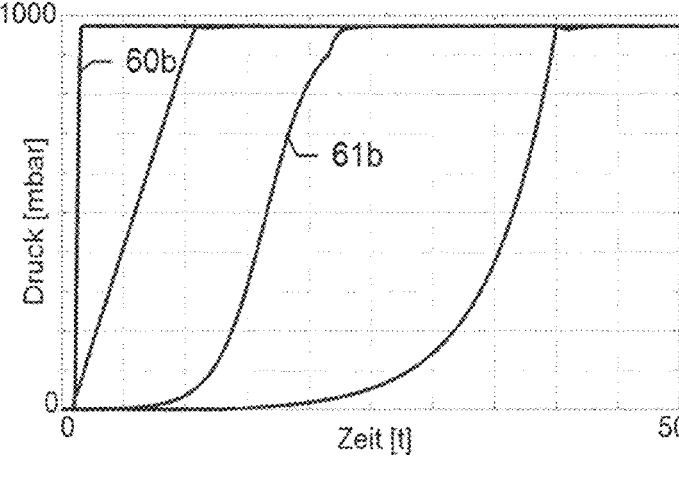

FIGS. 4a and 4b show different pressure-time profiles for evacuation processes (FIG. 4a) and venting processes (FIG. 4b) for one process volume.

The two curves 60a and 60b show typical pressure profiles for a chamber evacuation (60a) and a chamber venting (60b) with a classic angle valve according to the prior art, in particular with pneumatically operated valves. As can be seen, abrupt pressure changes occur here, especially when starting evacuation or venting—in the case of evacuation, a more immediate and sharp pressure drop, and in the case of venting, a significant and equally immediate pressure rise. These abrupt and rapid pressure changes can cause air turbulence in the chamber, resulting in particle separation and turbulence. Such effects are very detrimental to a processing operation carried out in the chamber, as they can result in severe contamination, e.g. of a wafer.

The disadvantageous pressure profiles result, for example, from the fact that a valve closure of a prior art valve is typically moved at a non-variable speed over its entire adjustment travel.

In contrast, the evacuation and venting of the process chamber can be precisely controlled or regulated with a valve according to the invention.

For this purpose, the control unit 40 of the vacuum valve according to the present invention has a process control functionality for controlling a process step. This process control functionality is set up in such a way that, during its execution, a provided process information. e.g. a set pressure profile for a process step, is processed and the process pressure present in the flow chamber 15 is measured by the pressure sensor 50. The displacement of the valve disk 17 is then controlled as a function of the processed process information and the process pressure. This displacement of the valve disk 17 can thus be performed in particular continuously and as a function of a time variable.

Process information provided as a nominal regulation profile can, for example, also define a nominal pressure for the process step as a function of a process time.

In addition, the process information can have information about a process gas provided in the flow chamber 15. Since different process gases have different (flow) properties, this information can have a direct and significant influence on a mass flow through the valve 10 and thus on the pressure profile to be set. It is therefore advantageous to take this into account.

As exemplified by the curves 61*a* and 61*b*, evacuation (61*a*) and venting (61*b*) with a valve according to the invention can be carried out in such a way that a pressure change can be controlled comparatively homogeneously and slowly, in particular in the area of very small valve opening cross-sections (i.e. close to the complete closing of the valve opening or shortly after a slight opening of the valve opening). For this purpose, the valve disk 17 can be moved comparatively slowly relative to the valve seat 16.

Before (in particular for evacuation of the chamber) or after (in particular for venting the chamber) such a homogeneous transition can then be followed by a faster adjustment of the valve plate 17, whereby e.g. the desired (complete) venting can be provided within a desired process time.

Due to the variability with respect to the adjustment of the valve disk 17 (e.g. speed), such a valve according to the invention can replace a plurality of valves which are required in the prior art for the adjustment of such a pressure profile Typical prior art processes, for example, require a first valve for minor pre-venting and a second valve for providing rapid, complete venting of the chamber.

The shown evacuation or venting can be carried out in particular as a control of valve positions (positions for the valve disk along or orthogonal to the first axis) depending on a measured pressure. For this purpose, the process information can, for example, specify a desired valve position for a certain pressure, which position is then set at such a measured pressure.

Alternatively, the process information can provide a desired regulating curve (pressure profile over a period of time) and the valve disk can be adjusted based on the measured pressure and the (already elapsed) process time. This regulation takes place in particular in such a way that the pressure change over time caused by the adjustment of the valve disk follows or provides a predetermined pressure profile (regulating curve).

Such regulation functionality can provide an improved, more flexible and more accurate pressure setting with a vacuum valve. The pressure and a pressure profile can be precisely set or adjusted with a single valve depending on the process (different fluids and pressure profiles) and individually for different process steps.

Figure 5:
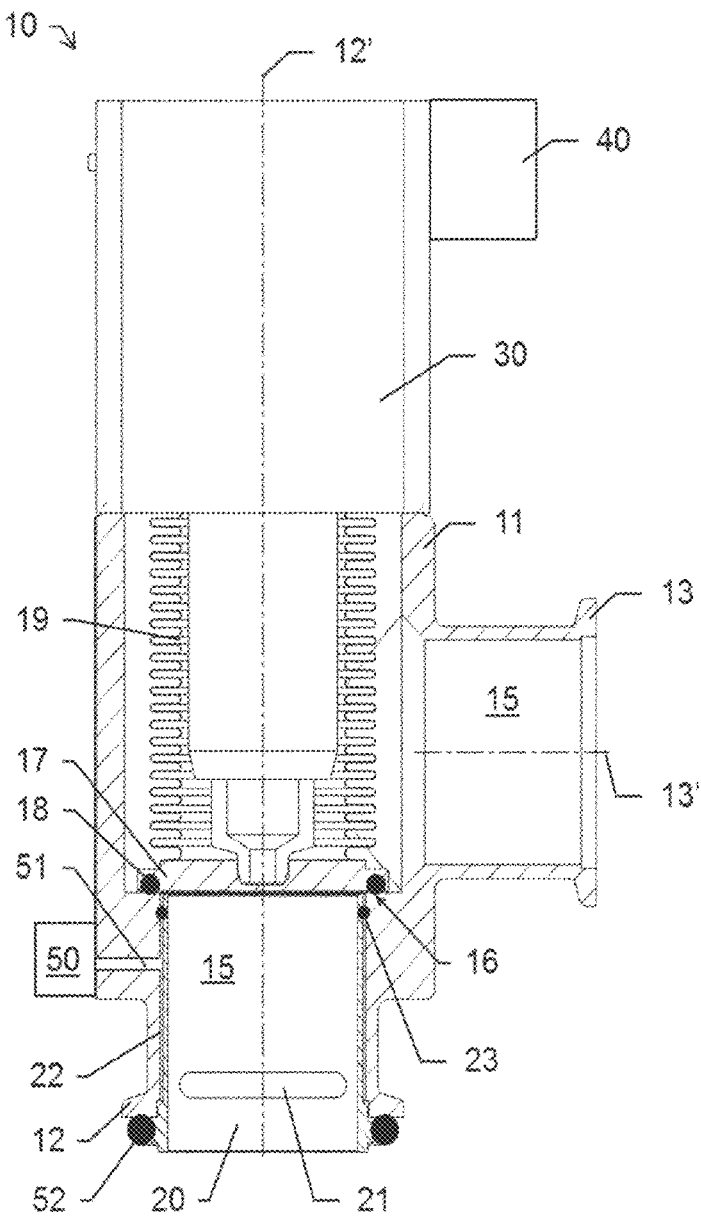
FIG. 5 shows another embodiment of an angle valve according to the invention.

FIG. 5 shows a further embodiment of a vacuum valve 10 according to the invention.

In contrast to an angle valve 10 according to FIG. 1, the sleeve 20 here has a further seal 23. The seal 23 provides a seal to the inner wall of the valve housing 11. In this way, the intermediate space 22 can be limited. The seal 23 thus separates the intermediate space 22 in the direction of the valve seat 16, whereby the intermediate space 22 is not part of the flow chamber 15, i.e. a fluid flowing through the valve does not flow through the intermediate space 22, but the intermediate space serves as a connecting space for the pressure sensor 50.

By arranging the sleeve 20 as shown for example in FIG. 1 or FIG. 5, a flow path along which a fluid must flow to the pressure sensor 50 or to the recess 51 through the intermediate space 22 can be extended Such an extension of a flow path or a flow channel can therefore be advantageous, since the flow velocity of a fluid decreases with increasing distance covered, in particular at an inner wall of a channel through which the fluid flows. Intermolecular forces within the fluid and frictional forces between fluid and solid surface influence the flow velocity (hydrodynamic boundary layer).

The length of the flow path from the sleeve recess 21 to the mouth of the recess 51 corresponds (at least partially) to the distance to be covered by a fluid for a pressure measurement. In particular, the length of the flow path is selected or set so that the flow velocity at the edge of the intermediate space 22 is at least very small or negligible when it reaches the mouth of the recess 51 and thus no falsification of the pressure measurement occurs. If the fluid were to flow past the channel mouth at a comparatively high velocity, the pressure in the channel 22 would drop and a pressure measurement with the pressure sensor 50 would deliver values that are too small.

In particular, the length of the flow path along the intermediate space 22 is selected so that a pressure measured with the sensor 50 corresponds to the internal chamber pressure. In particular, the length of the flow path (up to the pressure sensor 50 or up to the mouth of the recess 51 in the intermediate space 22) corresponds for this purpose to 20 times to 40 times the width of the intermediate space 22 (from the sleeve wall to the inner wall of the valve housing 11) or the diameter of a flow channel formed.

It is understood that the figures shown are only schematic illustrations of possible exemplary embodiments. According to the invention, the various approaches can also be combined with each other and with prior art devices for closing process volumes under vacuum conditions.

The invention claimed is:

1. A vacuum valve for gas-tight interruption of a flow path, comprising
   a valve housing having
      a first port in the direction of a first axis,
      a second port in the direction of a second axis, and
      a valve seat arranged in the flow path of a flow chamber, wherein the flow chamber interconnects the first port and the second port,
   a valve disk, which is at least partially axially displaceably guided within the flow chamber along the first axis perpendicularly to a surface of the valve seat by an adjustment path in such a way that a closure surface of the valve disk facing the valve seat can be brought into a closing position for the gas-tight interruption of the flow path and, in this process, can be brought into contact with the valve seat, and can be provided for releasing the flow path in an open position without contact with the valve seat,
   a drive unit, wherein the drive unit is coupled to the valve disk in such a way that a controlled displacement of the valve disk along or orthogonally to the first axis can be provided by means of the drive unit, and
   a control unit for controlling the displacement of the valve disk,
   wherein
      the vacuum valve has a single pressure sensor arranged in such a way that a process pressure present in the flow chamber can be measured by means of the pressure sensor,
      the control unit comprises a process control functionality for the control of a process step, which is arranged in such a way that during its execution
         a provided process information is processed,
         the process pressure present in the flow chamber is measured by the pressure sensor, and
         the displacement of the valve disk is controlled based on the processed process information and, with respect to a current pressure information, only on the process pressure.

2. The vacuum valve according to claim 1, wherein the drive unit comprises an electric motor, wherein the electric motor is coupled to the valve disk in such a way that the controlled displacement of the valve disk along or orthogonally to the first axis can be provided by means of the electric motor.

3. The vacuum valve according to claim 1, wherein the process control functionality is configured in such a way that the displacement of the valve disk takes place continuously and/or as a function of a time variable.

4. The vacuum valve according to claim 1, wherein the process information comprises a nominal regulation profile and the nominal regulation profile defines a nominal pressure for the process step as a function of a process time.

5. Vacuum valve according to claim 1, wherein the process information defines a nominal pressure profile for at least part of the process step.

6. The vacuum valve according to claim 1, wherein the process information comprises information about a process gas provided in the flow chamber.

7. The vacuum valve according to claim 1, wherein the process control functionality is designed in such a way that a displacement speed for the displacement of the valve disk can be set as a function of the process information.

8. The vacuum valve according to claim 1, wherein the process control functionality is designed such that the valve disk is displaced at different speeds during the process step.

9. The vacuum valve according to claim 1, wherein
the process step comprises a venting operation for a process chamber connected to the vacuum valve,
the process information provides a venting pressure profile for the venting process,
the drive unit is controlled by the process control functionality in such a way that
in a first venting section, a displacement of the valve disk from the closed position into a first open position takes place at a first displacement speed, and
in a second venting section, a displacement of the valve disk from the first open position into a second open position takes place at a second displacement speed, wherein the first displacement speed is smaller than the second displacement speed, and the first open position provides an opening cross-section which is smaller than an opening cross-section of the second open position.

10. The vacuum valve according to claim 1, wherein
the process step comprises an evacuation process for a process chamber connected to the vacuum valve,
the process information provides an evacuation pressure profile for the evacuation process,
the drive unit is controlled by the process control functionality in such a way that
in a first evacuation section, a displacement of the valve disk from a third open position to a fourth open position takes place at a third displacement speed, and
in a second evacuation section, a displacement of the valve disk from the fourth open position to the closed position takes place at a fourth displacement speed,
wherein the fourth displacement speed is smaller than the third displacement speed, and the fourth open position provides an opening cross-section which is smaller than an opening cross-section of the third open position.

11. The vacuum valve according to claim 1, wherein the valve housing has a recess, a channel or a bore, wherein
the recess connects the flow chamber and a valve outer side and
the pressure sensor is arranged on the valve outer side and connected to the recess.

12. The vacuum valve according to claim 1, wherein the vacuum valve comprises a sleeve, wherein
the sleeve is shaped and arranged such that an intermediate space is formed between a sleeve wall of the sleeve and an inner wall of the valve housing,
the sleeve wall has a sleeve recess, and
the sleeve recess connects the intermediate space and the flow chamber.

13. The vacuum valve according to claim 11, wherein the recess is arranged and shaped such that the recess connects the pressure sensor and an intermediate space.

14. The vacuum valve according to claim 12, wherein a length of a flow path in the intermediate space from the sleeve recess to the recess is in a range of 20 times to 40 times a width of the intermediate space.

15. A vacuum valve for gas-tight interruption of a flow path, comprising
a valve housing having
a first port in the direction of a first axis,
a second port in the direction of a second axis, and
a valve seat arranged in the flow path of a flow chamber, wherein the flow chamber interconnects the first port and the second port,
a valve disk, which is at least partially axially displaceably guided within the flow chamber along the first axis perpendicularly to a surface of the valve seat by an adjustment path in such a way that a closure surface of the valve disk facing the valve seat can be brought into a closing position for the gas-tight interruption of the flow path and, in this process, can be brought into contact with the valve seat, and can be provided for releasing the flow path in an open position without contact with the valve seat,
a drive unit, wherein the drive unit is coupled to the valve disk in such a way that a controlled displacement of the valve disk along or orthogonally to the first axis can be provided by means of the drive unit, and
a control unit for controlling the displacement of the valve disk,
wherein
the vacuum valve has a pressure sensor arranged in such a way that a process pressure present in the flow chamber can be measured by means of the pressure sensor,
the control unit comprises a process control functionality for the control of a process step, which is arranged in such a way that during its execution
a provided process information is processed,
the process pressure present in the flow chamber is measured by the pressure sensor, and
the displacement of the valve disk is controlled depending on the processed process information and the process pressure, and
wherein the process control functionality is designed in such a way that a displacement speed for the displacement of the valve disk can be set as a function of the process information.

16. A vacuum valve for gas-tight interruption of a flow path, comprising
a valve housing having
a first port in the direction of a first axis,
a second port in the direction of a second axis, and
a valve seat arranged in the flow path of a flow chamber, wherein the flow chamber interconnects the first port and the second port,
a valve disk, which is at least partially axially displaceably guided within the flow chamber along the first axis perpendicularly to a surface of the valve seat by an adjustment path in such a way that a closure surface of the valve disk facing the valve seat can be brought into a closing position for the gas-tight interruption of the flow path and, in this process, can be brought into contact with the valve seat, and can be provided for releasing the flow path in an open position without contact with the valve seat, a drive unit, wherein the drive unit is coupled to the valve disk in such a way that a controlled displacement of the valve disk along or orthogonally to the first axis can be provided by means of the drive unit, and a control unit for controlling the displacement of the valve disk, wherein the vacuum valve has a pressure sensor arranged in such a way that a process pressure present in the flow chamber can be measured by means of the pressure sensor, the control unit comprises a process control functionality for the control of a process step, which is arranged in such a way that during its execution a provided process information is processed, the process pressure present in the flow chamber is measured by the pressure sensor, and the displacement of the valve disk is controlled depending on the processed process information and the process pressure, and wherein the vacuum valve comprises a sleeve, wherein the sleeve is shaped and arranged such that an intermediate space is formed between a sleeve wall of the sleeve and an inner wall of the valve housing, the sleeve wall has a sleeve recess, and the sleeve recess connects the intermediate space and the flow chamber.

*    *    *    *    *